(12) United States Patent
Genick, II

(10) Patent No.: US 7,125,026 B2
(45) Date of Patent: Oct. 24, 2006

(54) CAM-BOLT ASSEMBLY

(75) Inventor: Raymond M Genick, II, Waterford, MI (US)

(73) Assignee: Newfrey LLC, Newark, DE (US)

( * ) Notice: Subject to any disclaimer, the term of this patent is extended or adjusted under 35 U.S.C. 154(b) by 90 days.

(21) Appl. No.: 10/902,722

(22) Filed: Jul. 29, 2004

(65) Prior Publication Data

US 2005/0001397 A1   Jan. 6, 2005

Related U.S. Application Data

(63) Continuation-in-part of application No. 10/698,134, filed on Oct. 31, 2003.

(60) Provisional application No. 60/423,117, filed on Nov. 1, 2002.

(51) Int. Cl.
*B62D 17/00* (2006.01)

(52) U.S. Cl. ................................. 280/86.753

(58) Field of Classification Search .......... 280/86.75, 280/86.754, 86.757, 86.758; 411/398, 396, 411/531, 539, 368
See application file for complete search history.

(56) References Cited

U.S. PATENT DOCUMENTS

| | | | | |
|---|---|---|---|---|
| 696,582 A | | 4/1902 | Myers .......................... 411/397 |
| 2,525,217 A | * | 10/1950 | Glitsch ................... 292/256.73 |
| 2,769,333 A | * | 11/1956 | Reintjes ........................ 52/378 |
| 2,895,368 A | * | 7/1959 | Trigg, Jr. et al. ........... 411/396 |
| 3,041,913 A | * | 7/1962 | Liska ........................... 411/87 |
| 3,880,444 A | * | 4/1975 | Bridges ................. 280/86.753 |
| 4,214,444 A | * | 7/1980 | Fujioka et al. ................ 60/322 |
| 4,418,938 A | * | 12/1983 | Sullivan et al. ........ 280/86.753 |
| 4,650,208 A | * | 3/1987 | Mason ................... 280/86.757 |
| 4,790,703 A | * | 12/1988 | Wing .......................... 411/260 |
| 5,482,417 A | * | 1/1996 | Erickson ..................... 411/306 |
| 5,580,201 A | | 12/1996 | Brilmyer ..................... 411/354 |
| 5,775,719 A | * | 7/1998 | Holden ..................... 280/86.75 |
| 5,779,260 A | * | 7/1998 | Reilly et al. ........... 280/86.754 |
| 6,113,299 A | * | 9/2000 | Reichelt et al. ............... 403/13 |
| 6,345,945 B1 | * | 2/2002 | Hildebrandt ................ 411/369 |
| 6,409,189 B1 | * | 6/2002 | Orimoto et al. ....... 280/86.751 |
| 6,669,421 B1 | * | 12/2003 | Hofschneider .............. 411/354 |
| 6,764,404 B1 | * | 7/2004 | Gullickson et al. ........... 464/33 |
| 2005/0062248 A1 | * | 3/2005 | Winkler et al. ........ 280/86.758 |
| 2005/0129485 A1 | * | 6/2005 | Swim, Jr. ................... 411/396 |

* cited by examiner

*Primary Examiner*—Paul N. Dickson
*Assistant Examiner*—Leonard McCreary, Jr.
(74) *Attorney, Agent, or Firm*—Harness, Dickey & Pierce, P.L.C.

(57) ABSTRACT

A cam bolt assembly for using in a vehicle's suspension system to adjust the vehicle's wheel alignment having a threaded fastener defining a pair of longitudinal channels, a first cam plate is coupled to the threaded bolt, a second cam plate defining an aperture is mated to the pair of longitudinal channels. At least one of the cam plates has an arcuate slot configured to mate with a component of the suspension system.

20 Claims, 4 Drawing Sheets

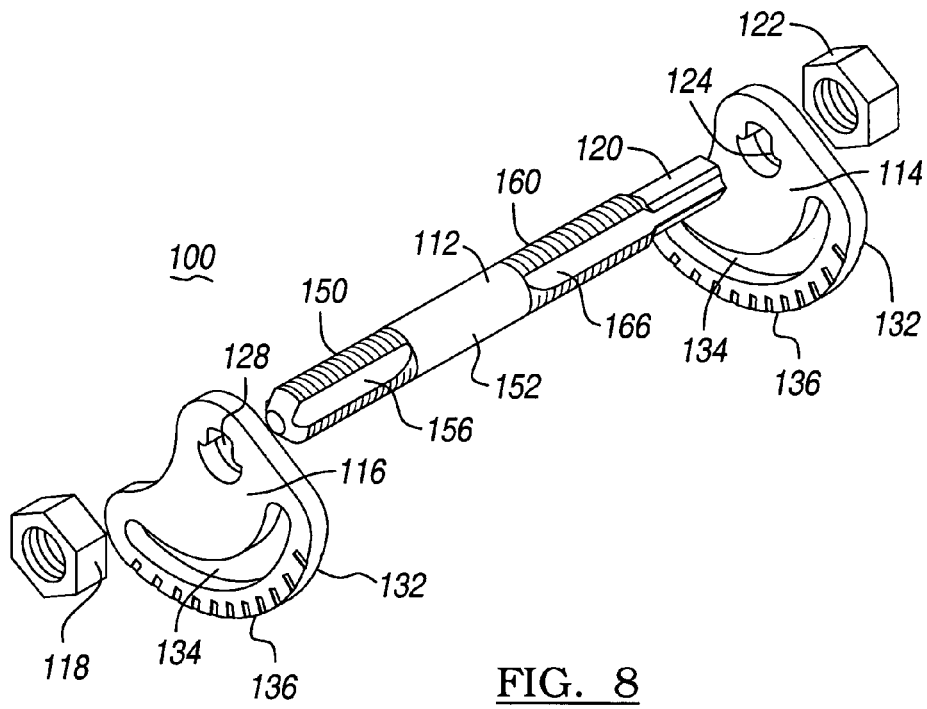
FIG. 8
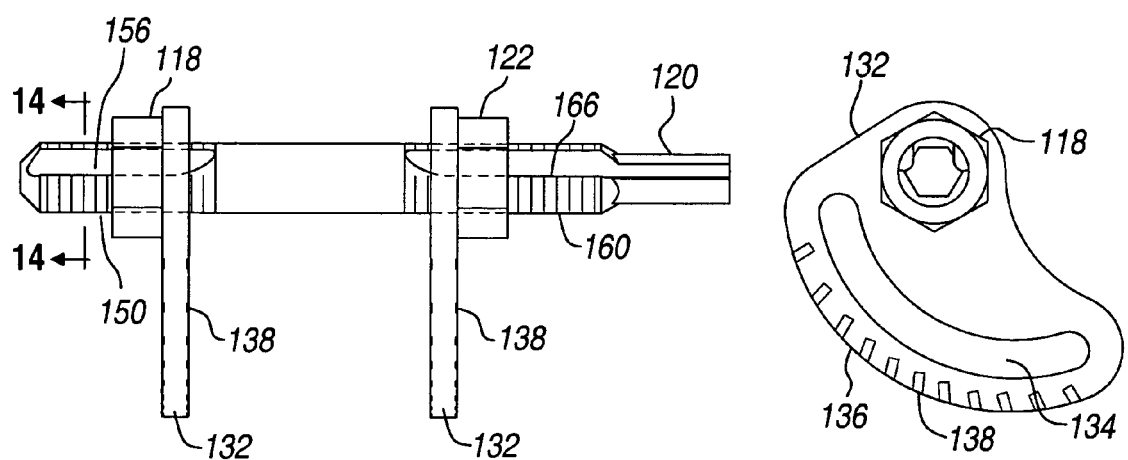
FIG. 9
FIG. 10

CAM-BOLT ASSEMBLY

CROSS-REFERENCE TO RELATED APPLICATIONS

This application is a continuation-in-part of U.S. patent application Ser. No. 10/698,134 filed on Oct. 31, 2003, which claims priority to U.S. Provisional Patent Application No. 60/423,117 filed on Nov. 1, 2002, both of which are incorporated herein by reference.

FIELD OF THE INVENTION

The present invention relates to a cam bolt for a vehicle suspension and, more particularly, to a cam bolt having a locking feature which efficiently couples a cam plate to a bolt without significantly reducing the bolt's effective strength.

BACKGROUND OF THE INVENTION

It has been known that plates can be coupled to shafts utilizing a single notch cut into the bolt surface. Traditionally, the plate has a D-shaped hole with a cross-section which corresponds to the cross-section of the notch disposed in the bolt is placed over the bolt and held using a threaded fastener.

Often, the plates are subject to torsional loading, which imparts torsional loading to the bolt. Often, designs require that these bolts have a particular torsional strength to ensure that the flange does not become dislodged from the bolt when loaded. In order to maintain the relative position of the plate with respect to the bolt during the torsional loading, the interaction of the plate with the bolt must be such that plastic deformation of the interface does not occur. For this condition to occur, large portions of the bolt surface have been removed to allow for proper interlocking of the members.

The notched bolt, because of its reduced cross-sectional area, has significantly reduced strength. As such, to maintain load requirements, the diameter of the bolt is typically significantly increased to compensate for the weakness in the threaded portion of the fastener. This increases cost and weight of the assembly.

SUMMARY OF THE INVENTION

A cam bolt assembly for using in a vehicle's suspension system to adjust the vehicle's wheel alignment is disclosed having a threaded fastener defining a pair of longitudinal channels, a first cam plate is coupled to the threaded bolt, a second cam plate defining an aperture is mated to the pair of longitudinal channels. At least one of the cam plates has an arcuate slot configured to mate with a component of the suspension system.

In another embodiment of the invention, both the first and second cam plates have an arcuate slot. The longitudinal channels of the threaded fastener have a T-shaped cross section.

In another embodiment of the invention, the threaded fastener has a knurl portion configured to mate with the first cam plate. Further, the channel of the cam bolt assembly defines a pair of exterior bearing surfaces which mate with a corresponding interior bearing surface within the aperture.

In an alternative preferred embodiment of the invention, a cam bolt assembly for using in a vehicle's suspension system to adjust the vehicle alignment is disclosed having a threaded fastener defined by a pair of longitudinal channels at each end of the fastener, a first cam plate defining an aperture which is mated to a first pair of longitudinal channels, a second cam plate defining an aperture mated to a second pair of longitudinal channels. At least one of the cam plates has an arcuate slot configured to mate with the component of the suspension system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 represents a perspective exploded view of a cam bolt according to an alternate embodiment of the present invention;

FIG. 9 represents a side view of the fastener according to an alternate embodiment of the present invention;

FIG. 10 is an end view of the fastener according to an alternate embodiment of the present invention;

DETAILED DESCRIPTION OF THE PREFERRED EMBODIMENTS

The following description of the preferred embodiments is merely exemplary in nature and is in no way intended to limit the invention, its application, or uses.

Figure 1:
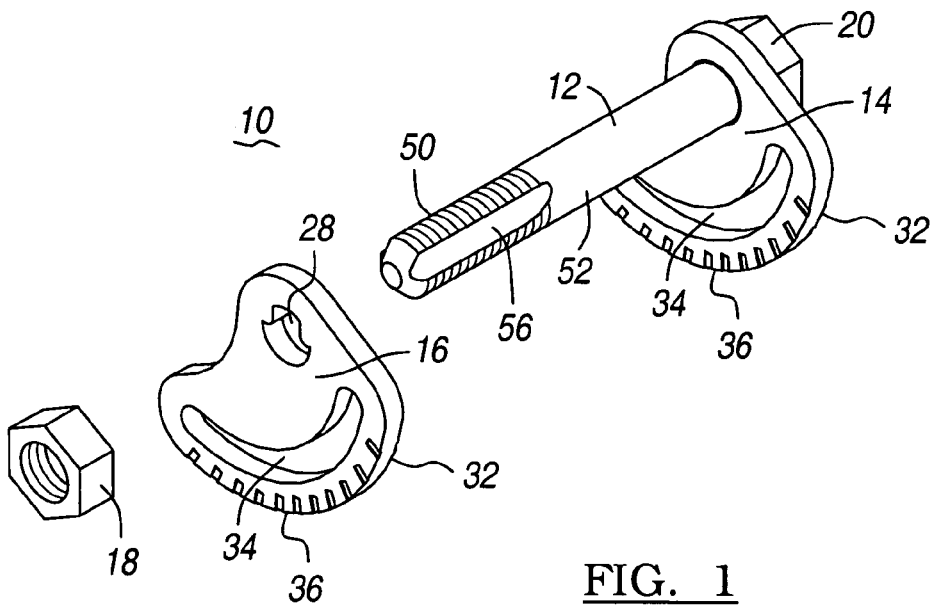
FIG. 1 represents a perspective exploded view of a cam bolt according to one embodiment of the invention.
Figure 2:
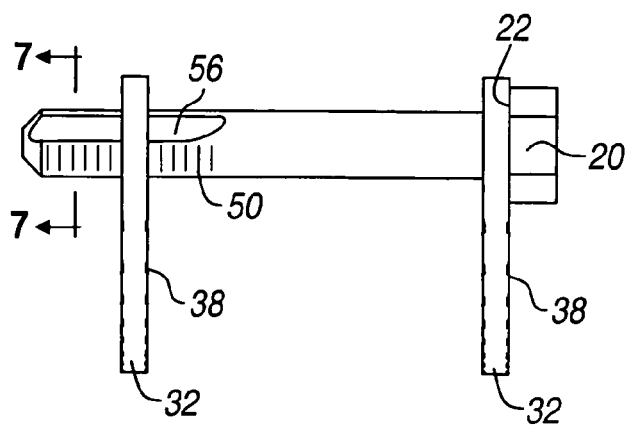
FIG. 2 represents a side view of the fastener according to the teachings of the present invention.

FIGS. 1 and 2 represent a perspective exploded view and a side view of a cam bolt assembly 10 according to the teachings of the present invention. The cam bolt assembly 10, which is formed of a threaded bolt 12, first cam plate 14, second cam plate 16, and a nut 18, is used in a vehicle's suspension system to adjust the vehicle's wheel alignment. When assembled, the cam bolt assembly is configured to have a rotational tolerance of ±3 degrees.

The threaded bolt 12 has a bolt head 20 having a bolt head inner surface 22 which supports the first cam plate 14. The first cam plate 14 defines a circular aperture 24, which has a radius substantially equal to the diameter of the threaded bolt 12. The first cam plate 14 is rotationally coupled to the threaded bolt 12 by a knurl 26 formed on the threaded bolt 12 adjacent the bolt head 20. In this regard, the circular aperture 24 is configured to have a diameter such that the coupling of the circular aperture with the knurl 26 rotationally and longitudinally fixes the first cam plate 14 to the bolt 12.

As best seen in FIG. 2, the second cam plate 16 has an aperture 28 which is configured to mate with the cross section 30 of the threaded portion of the threaded bolt 12. The second cam plate 16 is disposed about the threaded bolt 12 so that the first and second cam plates 14 and 16 are generally parallel.

Figure 3:
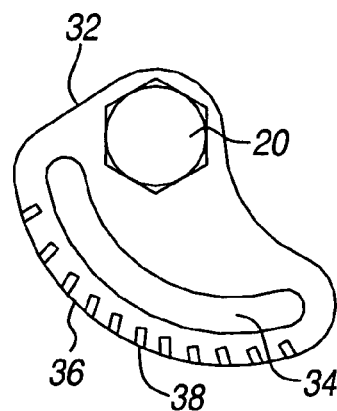
FIG. 3 is an end view of the fastener according to the teachings of the present invention.

FIG. 3 is an end view of the cam bolt assembly 10 according to the teachings of the present invention. Each cam plate 14 and 16 defines a generally arcuate slot 34. The arcuate slots 34 are used to adjustably couple portions of the vehicle's suspension system. The position of the suspension components (not shown) mounted to the cam plates 14 and 16 can be adjusted by translating the suspension components within the arcuate slot 34.

Each cam plate 14 and 16 additionally defines a generally triangular periphery 32. One side of the triangle periphery 32 has an exterior surface 36 which generally conforms to the arcuate slot 34. Disposed between the exterior surfaces 36 is a plurality of measurement marks 38 which are used to position suspension components within the arcuate slot 34. Each cam plate 14 and 16 is formed of low carbon steel and has a thickness of about 5 mm.

Figure 4:
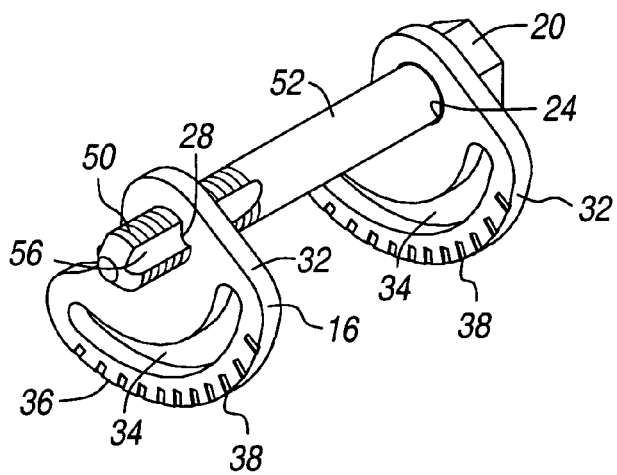
FIG. 4 is a perspective assembled view of the retaining bolt.

FIG. 4 is a perspective assembled view of the cam bolt assembly 10. Shown is the second cam plate 16 disposed over a threaded portion 50 of the threaded bolt 12. Defined on the threaded portion 50 of the threaded bolt 12 is a pair of longitudinal channels 56. The pair of channels 56 can optionally extend into a shoulder portion 52 of the threaded fastener 12. The channels 56 define a generally T-shaped cross section.

Figure 5:
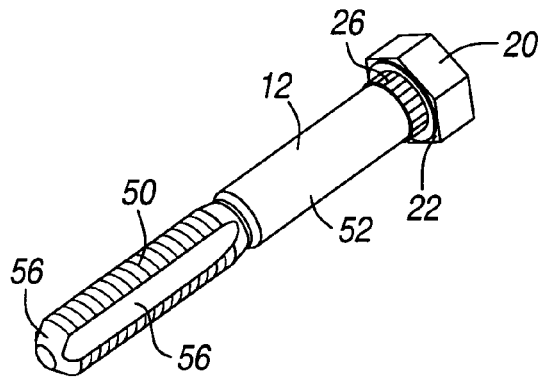
FIG. 5 is a perspective view of the threaded bolt.
Figure 6:
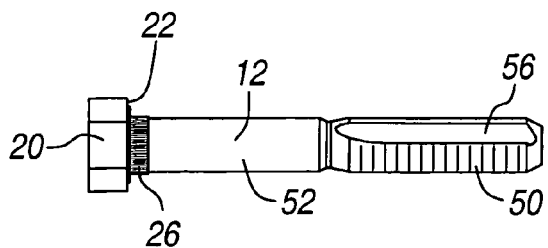
FIG. 6 is a side view of the threaded bolt shown in FIG. 5.

FIGS. 5 and 6 are perspective and side views of the threaded bolt 12. Shown is the knurl portion 26 defined adjacent the head 20 on the unthreaded shoulder portion 52 of the threaded fastener 12. The knurl portion 26 is pressed into the aperture 24 of the first plate 14. While the threaded bolt 12 can be formed of 1018 steel, any suitable material can be used. Optionally, this material can be heat treated. The second cam plate 16 and the channels 56 define an interface capable of withstanding 150 nm of torque, and preferably 200 nm of torque.

Figure 7:
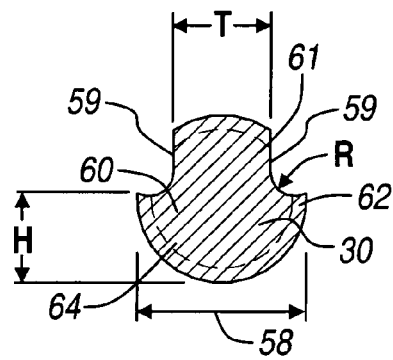
FIG. 7 is a cross sectional view of the threaded bolt shown in FIG. 2.

FIG. 7 is a cross sectional view of the threaded bolt shown in FIG. 5 and 6. The threaded portion 50 has a diameter 58 of between 13.75 and 14 mm. The pair of channels 56 defines a first portion having a thickness T of about 8.3 mm. The pair of channels 56 can be cut through a portion of a threaded portion of the threaded bolt. Additionally, it is envisioned the channels can be cut through the entire length of the threaded portion, into a non-threaded portion of the bolt. The channels 56 further define a pair of exterior bearing surfaces 59 which mate with the corresponding interior surfaces within the aperture 28. The second portion 60 has a height H of about 8.0 mm. Each channel has an inner radius R of about 2.0 mm. Each channel 56 cuts through the threads 62 of the threaded portion into the central core portion 64 of the cross section 30. Preferably, the bolt will have a bolt strength class rating of 8.8 to 10.9 and greater. The previously mentioned specific dimensions disclosed herein have been found to allow the cam bolt assembly 10 to maintain a strength class 10.9 rating, while maintaining the torsional stability needed in suspension components.

FIGS. 8 and 9 represent a perspective exploded view and a side view of an alternative embodiment of a cam bolt assembly 100 according to the teachings of the present invention. Cam bolt assembly 100, which is formed of a threaded fastener 112, a first cam plate 114, a first nut 122 and a second nut 118 is used in a vehicle suspension system to adjust the vehicle's wheel alignment. When assembled, the cam bolt assembly is configured to have a rotational tolerance of ±3°.

The threaded fastener 112 has a non-threaded area 120 that is distal to the threaded area 160. The first cam plate 114 has an aperture 124 which is configured to mate with cross section 130 of the threaded portion 160 of the fastener 112 and is secured by nut 122. The second cam plate 116 has an aperture 128 which is configured to mate with cross section 130 of the threaded bolt portion 150 of the fastener 112 and is secured by nut 118. The second cam plate 116 is disposed about fastener 112 so that the first and second cam plates 114 and 116 are generally parallel.

FIG. 10 is an end view of the cam bolt assembly 100 according to the teachings of the invention. Each cam plate 114 and 116 defines a generally arcuate slot 134. These arcuate slots 134 are used to adjustably couple portions of the vehicle's suspension system. The position of the suspension components (not shown) mounted to the cam plates 114, 116 can be adjusted by translating the suspension components within the arcuate slot 134.

Each cam plate 114, 116 additionally define a generally triangular periphery 132. One side of the triangular periphery 132 has an exterior surface 136 which generally conforms to the arcuate slot 134. Disposed between the exterior surfaces 136 is a plurality of measurement marks 138 which are used to position suspension components within the arcuate slot 134. Each cam plate 114, 116 is formed of low carbon steel and has a thickness of about 5 mm.

Figure 11:
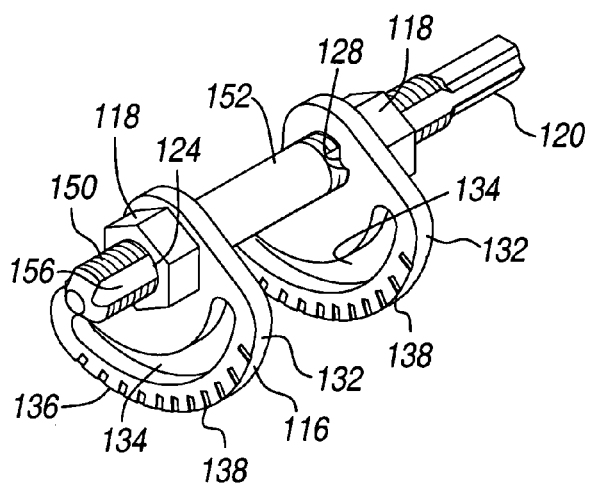
FIG. 11 is a perspective assembled view of the retaining bolts according to an alternate embodiment of the present invention.

FIG. 11 is a perspective assembled view of the cam bolt assembly 100 according to the teachings of the present invention. Shown is a first cam plate 114 disposed over a threaded portion 160 of the threaded bolt 112 and secured by nut 122. Defined on the threaded portion 160 of the threaded bolt 112 is a first pair of longitudinal channels 166. The first pair of channels 166 can optionally extend into shoulder portion 152 of the threaded fastener 112. The first pair of channels 166 defines a generally T-shaped cross section of the threaded bolt 112. Also shown is the second cam plate 116 disposed over a threaded portion 150 of the threaded bolt 112 and secured by nut 118. Defined on the threaded portion 150 of the threaded bolt 112 is a second pair of longitudinal channels 156. The second pair of channels 156 can optionally extend to a shoulder portion 152 of threaded fastener 112. The second pair of channels 156 defines a generally T-shaped cross section of the end of the threaded bolt 112.

Figure 12:
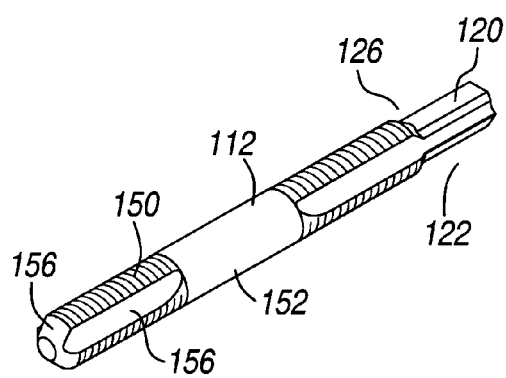
FIG. 12 is a perspective view of the threaded bolt according to an alternate embodiment of the present invention.
Figure 13:
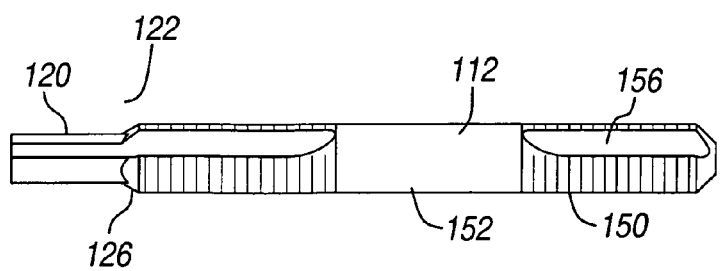
FIG. 13 is a side view of the threaded bolt shown in FIG. 12.

FIGS. 12 and 13 are perspective and side views of the threaded bolt 112. Shown is a non-threaded end 120 that is distal to the first pair of longitudinal channels 166 which are defined on a first threaded portion 160. The non-threaded end 120 may have a cross section that has a plurality of flat surfaces which may for example correspond with a standard measurement of an Allen key hex pattern. The first pair of longitudinal channels 156 can extend into the non-threaded end 120. On the other end of the threaded fastener 112 is a second threaded portion 150 which includes a second pair of longitudinal channels 156 of which such channels may extend into the shoulder portion 152 of the threaded fastener 112. While the threaded bolt 112 may be formed of 1018 steel, any suitable material may be used. Optionally, this material may be heat treated. The first cam plate 114 and the first channels 166 define an interface capable of withstanding 150 nm of torque and preferably 200 nm of torque. The second cam plate 116 and the second set of channels 156 define an interface capable of withstanding 150 nm of torque and preferably 200 nm of torque.

Figure 14:
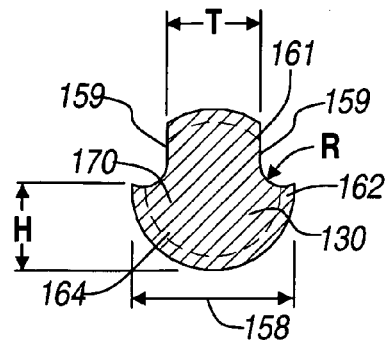
FIG. 14 is a cross sectional view of the threaded bolt shown in FIG. 9.

FIG. 14 is a cross sectional view of the threaded bolt shown in FIGS. 5 and 6. The cross sectional dimensions of either the first threaded portion 160 or the second threaded portion 150 are equivalent, although they may be rotated with respect to each other. The threaded portion 150 has a diameter 158 of 13.75 and 14 mm. The pair of channels 156 define a portion having a thickness T of about 8.3 mm. The pair of channels 156 may be cut through a portion of a threaded portion 150 of the threaded bolt 112. Additionally, it is envisioned that the channels can be cut through the entire length of the threaded portion into the non-threaded portion of the bolt 152. The channels 156 further define a pair of exterior bearing surfaces 159 which mate with the corresponding interior surfaces within the aperture 128. The second portion 170 has a height H of about 8.0 mm. Each channel 156 may have an inner radius R of about 2.0 mm and preferably about 2.2 nm. Each channel 156 cuts through the threads 162 of the threaded portion 150 into the central core portion 164 of cross section 130. Preferably, the bolt will have a bolt strength class rating of 8.8 to 10.9 and greater. The previously mentioned specifically dimensions disclosed herein have been found to allow the cam bolt assembly to maintain a strength class 10.9 rating, while maintaining the torsional stability needed in suspension components.

The examples and other embodiments described herein are exemplary and are not intended to be limiting in describing the full scope of apparatus, systems, compositions, materials, and methods of this invention. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention. All patents cited herein, as well as, all publications, articles, brochures and product information discussed herein, are incorporated in their entirety herein by reference.

What is claimed is:

1. A cam bolt assembly for use in a vehicle's suspension system to adjust the vehicle's wheel alignment comprising:
   a threaded fastener defining first and second pairs of longitudinal channels at each end of the fastener;
   a first cam plate defining an aperture mated to the first pair of longitudinal channels;
   a second cam plate defining an aperture mated to the second pair of longitudinal channels; and
   wherein at least one of the cam plates has an arcuate slot configured to mate with a component of the suspension system.

2. The cam bolt assembly according to claim 1 wherein the first and the second cam plates comprise an arcuate slot.

3. The cam bolt assembly according to claim 1 wherein the threaded fastener has a substantially T-shaped cross section.

4. The cam bolt assembly according to claim 1 wherein at least one pair of channels define a pair of bearing surfaces which mate with the corresponding interior bearing surfaces within at least one of the apertures.

5. The cam bolt assembly according to claim 1 wherein at least one of the cam plates and at least one of the channels define an interface capable of withstanding 150 N-m of torque.

6. The cam bolt assembly according to claim 1 wherein the threaded fastener has a diameter of about 14 mm.

7. The cam bolt assembly according to claim 6 wherein at least one channel defines an inner radius of about 2.2 mm.

8. The cam bolt assembly according to claim 6 wherein at least one of the pair of channels is defined through threads of the threaded fastener into a central core portion of the threaded fastener.

9. The cam bolt assembly according to claim 6 wherein the bolt has a bolt strength class of 10.9.

10. An automotive vehicle suspension component used to adjust the vehicle alignment comprising:
    a fastener having a first threaded portion defining a first pair of longitudinal channels along a portion of the first threaded portion and a second threaded portion defining a second pair of longitudinal channels along a portion of the second threaded portion;
    a first cam plate defining an aperture mated to the first pair of longitudinal channels;
    a second cam plate defining an aperture mated to the second pair of longitudinal channels and wherein at least one of the cam plates has an arcuate slot configured to mate with a component of the suspension system.

11. The automotive vehicle suspension component according to claim 10 wherein the first and the second cam plates comprise an arcuate slot.

12. The automotive vehicle suspension component according to claim 10 wherein the threaded fastener has a substantially T-shaped cross section.

13. The automotive vehicle suspension component according to claim 10 wherein at least one pair of channels define a pair of bearing surfaces which mate with the corresponding interior bearing surfaces within at least one of the apertures.

14. The automotive vehicle suspension component according to claim 10 wherein at least one of the cam plates and at least one of the channels define an interface capable of withstanding 150 N-m of torque.

15. The automotive vehicle suspension component according to claim 10 wherein the threaded fastener has a diameter of about 14 mm.

16. The automotive vehicle suspension component according to claim 15 wherein at least one of the pair of channels is defined through threads of the threaded fastener into a central core portion of the threaded fastener.

17. The automotive vehicle suspension component according to claim 15 wherein the bolt has a bolt strength class of 10.9.

18. The automotive vehicle suspension component according to claim 10 wherein at least one channel defines an inner radius of about 2.2 mm.

19. The suspension component according to claim 10 wherein the first pair of longitudinal channels is substantially aligned with the second pair of longitudinal channels.

20. The suspension component according to claim 10 further comprising a non threaded portion disposed between the first and second pairs of longitudinal channels.

* * * * *